(12) United States Patent
Jonsson

(10) Patent No.: US 10,084,371 B2
(45) Date of Patent: Sep. 25, 2018

(54) MULTILEVEL CONVERTER WITH A CHOPPER CIRCUIT

(71) Applicant: ABB SCHWEIZ AG, Baden (CH)

(72) Inventor: Tomas Jonsson, Norrköping (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/750,088

(22) PCT Filed: Sep. 21, 2015

(86) PCT No.: PCT/EP2015/071558
§ 371 (c)(1),
(2) Date: Feb. 2, 2018

(87) PCT Pub. No.: WO2017/050345
PCT Pub. Date: Mar. 30, 2017

(65) Prior Publication Data
US 2018/0226882 A1  Aug. 9, 2018

(51) Int. Cl.
*H02H 7/125* (2006.01)
*H02M 7/10* (2006.01)
(Continued)

(52) U.S. Cl.
CPC ............... *H02M 1/32* (2013.01); *H02J 3/36* (2013.01); *H02M 7/219* (2013.01); *H02M 7/483* (2013.01);
(Continued)

(58) Field of Classification Search
CPC ... G05F 1/565; H02M 7/1557; H02M 7/1623; H02M 7/1626; H02H 7/1255
(Continued)

(56) References Cited

U.S. PATENT DOCUMENTS 5,986,909 A * 11/1999 Hammond ............... H02M 7/49
363/37
2011/0019449 A1* 1/2011 Katoh .................... H02M 1/088
363/124
(Continued)

FOREIGN PATENT DOCUMENTS

CN    102938560 A    2/2013
CN    204179684 U    2/2015
(Continued)

OTHER PUBLICATIONS

Dorn et al., "HVDC and Power Electronic Systems for Overhead Line and Insulated Cable Applications—Trans Bay Cable—A Breakthrough of VSC Multilevel Converters in HVDC Transmission", Cigre, 2012, San Francisco Colloquium.
(Continued)

*Primary Examiner* — Gary Nash
(74) *Attorney, Agent, or Firm* — Birch, Stewart, Kolasch & Birch, LLP

(57) ABSTRACT

A multilevel converter includes a first and a second converter block series-connected between two DC terminals and a chopper circuit between the blocks. Each block includes a number of valve arm strings, each including an upper and a lower valve arm and a number of converter cells. A midpoint between the upper and lower arm of a string of the first block is connected to a corresponding primary AC terminal and a midpoint between the upper and lower arm of a corresponding string of the second block is connected to a corresponding secondary AC terminal. The chopper circuit comprises a power dissipating element in parallel with a circuit breaker.

20 Claims, 3 Drawing Sheets

(51) Int. Cl.
| | |
|---|---|
| *H02M 7/04* | (2006.01) |
| *H02M 5/42* | (2006.01) |
| *H02M 7/68* | (2006.01) |
| *H02M 7/155* | (2006.01) |
| *H02M 1/32* | (2007.01) |
| *H02M 7/483* | (2007.01) |
| *H02J 3/36* | (2006.01) |
| *H02M 7/5387* | (2007.01) |
| *H02M 7/219* | (2006.01) |

(52) U.S. Cl.
CPC ............... *H02M 7/53871* (2013.01); *H02M 2007/4835* (2013.01)

(58) Field of Classification Search
USPC .... 323/271, 274, 276, 284, 285; 363/51, 53, 363/65, 67, 68, 78, 89, 92, 124, 129
See application file for complete search history.

(56) References Cited

U.S. PATENT DOCUMENTS

| | | |
|---|---|---|
| 2012/0133343 A1 | 5/2012 | Grbovic |
| 2013/0128630 A1 | 5/2013 | Jensen et al. |
| 2013/0258726 A1* | 10/2013 | Mukherjee ............... H02J 3/36 363/40 |
| 2015/0009594 A1 | 1/2015 | Okaeme et al. |
| 2016/0285373 A1* | 9/2016 | Lin ........................ H02J 3/36 |

FOREIGN PATENT DOCUMENTS

| | | |
|---|---|---|
| WO | WO 2015/014123 A1 | 2/2015 |
| WO | WO 2015/067322 A1 | 5/2015 |

OTHER PUBLICATIONS

International Preliminary Report on Patentability, issued in PCT/EP2015/071558, dated Sep. 5, 2017.

International Search Report, issued in PCT/EP2015/071558, dated Jun. 23, 2016.

Karaagac et al., "Examination of Fault Ride-Through Methods for Off-Shore Wind Farms Connected to the Grid Through VSC-Based HVDC Transmission", 2012.

Written Opinion of the International Searching Authority, issued in PCT/EP2015/071558, dated Jun. 23, 2016.

* cited by examiner

MULTILEVEL CONVERTER WITH A CHOPPER CIRCUIT

FIELD OF INVENTION

The present invention generally relates to multilevel converters. More particularly the present invention relates to a multilevel converter configured to convert between alternating current and direct current as well as to a method and computer program product for handling power dissipation during faults at an alternating current side or a direct current side of the multilevel converter.

BACKGROUND

Power dissipating elements such as resistors and varistors are of interest to use in various power transmission situations in order to dissipate generated power when there is a fault along the power transmission path.

One exemplifying situation when such an element or circuit may be of interest to use is in the case when there is an isolated power generation system, such as a windfarm or a hydro power solar panel farm connected to an alternating current (AC) transmission system via a direct current (DC) transmission system, such as a High Voltage Direct Current (HVDC) power transmission system.

In this case, if there is a fault in the AC or in the DC system, it is possible to add a resistive circuit to the AC system or a chopper circuit to the DC system. Both the resistive circuit and the chopper circuit would then comprise a resistor and a switch for connecting the resistor to the system in question. In both cases the resistor dissipates energy generated in the power generation system and supports the frequency stability of the AC system.

In power transmission from remote power generation centers where DC overhead lines are used, DC faults will be critical related to the complete interruption of power transmission resulting in over-frequency conditions of the generating units. A traditional DC chopper connected on a DC bus of the DC transmission system will not be able to absorb active power due to the low DC voltage.

Traditionally such choppers have thus been placed in the DC system. An example of this can be seen in CN 204179684.

For HVDC the cost of the switch becomes substantial due to the high voltage capability required and that the switch requires direct current breaking capability. Solutions to achieve integration of the chopper functionality in the main converters would therefore be desirable.

One attractive placing of a chopper circuit is thus in a converter, such as a voltage source converter converting between AC and DC and being placed in such a DC transmission system as a part of an interface to the AC power generating system. This type of converter is often a modular multilevel converter.

The article "HVDC and Power Electronic Systems for Overhead Line and Insulated Cable Applications" by J. Dorn et al, CIGRE Colloquium on H VDC and Power Electronic Systems, San Francisco 2012 suggests the use of a modularized chopper in such a voltage source converter. However, the modularization of choppers is in many situations not economical due to the additional power electronic switches required or feasible related to the thermal stresses and cooling requirements.

There is in view of this a need for an alternative chopper realization in a converter converting between AC and DC and provided as a part of an interface to a power generating system.

SUMMARY OF THE INVENTION

The present invention is directed towards providing a multilevel converter that has an alternative chopper realization.

This object is according to a first aspect achieved through a multilevel converter having an alternating current (AC) side and a Direct Current (DC) side and being configured to convert between AC and DC and comprising
at least two converter blocks connected in series between a first and a second DC terminal, and
a chopper circuit connected between the converter blocks, wherein
each converter block comprises a number of parallel valve arm strings,
where each valve arm string comprises an upper valve arm connected in series with a lower valve arm having a number of converter cells connected in cascade,
a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal, and
the chopper circuit comprises a power dissipating element in parallel with a circuit breaker.

Another object is to handle power dissipation during faults at the AC side or the DC side of the multilevel converter according to the first aspect.

This object is according to a second aspect achieved through a method for handling power dissipation during faults at an alternating current (AC) side or a direct current (DC) side of a multilevel converter configured to convert between AC and DC, the method being performed in the multilevel converter and comprising
at least two converter blocks connected in series between a first and a second DC terminal, and
a chopper circuit connected between the converter blocks, wherein
each converter block comprises a number of parallel valve arm strings,
where each valve arm string comprises an upper valve arm connected in series with a lower valve arm having a number of converter cells connected in cascade,
a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal, and
the chopper circuit comprises a power dissipating element in parallel with a circuit breaker,
the method comprising
controlling the converter to dissipate energy received via the AC terminals upon the detection of a fault at one of the sides of the multilevel converter.

This object is according to a third aspect also achieved through a computer program product for handling power dissipation during faults at an alternating current (AC) side or a direct current (DC) side of a multilevel converter configured to convert between AC and DC, the multilevel converter comprising at least two converter blocks connected in series between a first and a second DC terminal, and a chopper circuit connected between the converter blocks, wherein each converter block comprises a number of parallel valve arm strings, where each valve arm string comprises an upper valve arm connected in series with a lower valve arm having a number of converter cells connected in cascade, a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal, and the chopper circuit comprises a power dissipating element in parallel with a circuit breaker, the computer program product comprising a data carrier with computer program code which computer program code when being loaded in a control unit for the multilevel converter is configured to cause the control unit to control the converter to dissipate energy received via the AC terminals upon the detection of a fault at one of the sides of the multilevel converter.

The invention has a number of advantages. It allows the non-transferred energy to be minimized and thereby also the frequency at the AC side may be stabilized. The circuit breaker can be made simple, because it does not need any current breaking capability due to the ability of the converter to control the current through the chopper circuit close to zero. The cost of the chopper circuit may thereby be reduced. The placing also makes the chopper operation available both for DC and AC side fault ride through. Furthermore the placing between the first and second converter blocks allows the chopper circuit to have a low voltage rating, only defined by the energy absorption requirements, which further simplifies the construction.

BRIEF DESCRIPTION OF THE DRAWINGS

The present invention will in the following be described with reference being made to the accompanying drawings, where FIG. 1 schematically shows a power generating system connected to an AC grid via a DC power transmission system, FIG. 2 schematically shows an interface between the DC power transmission system and the power generating system, which interface comprises a converter for converting between AC and DC, FIG. 3 schematically shows a flow chart of a number of method steps performed in method for handling power dissipation during faults at one of the sides of the converter, and FIG. 4 schematically shows a computer program product comprising computer program code for handling power dissipation during faults at one of the sides of the converter.

DETAILED DESCRIPTION OF THE INVENTION

In the following, a detailed description of preferred embodiments of the invention will be given.

Figure 1:
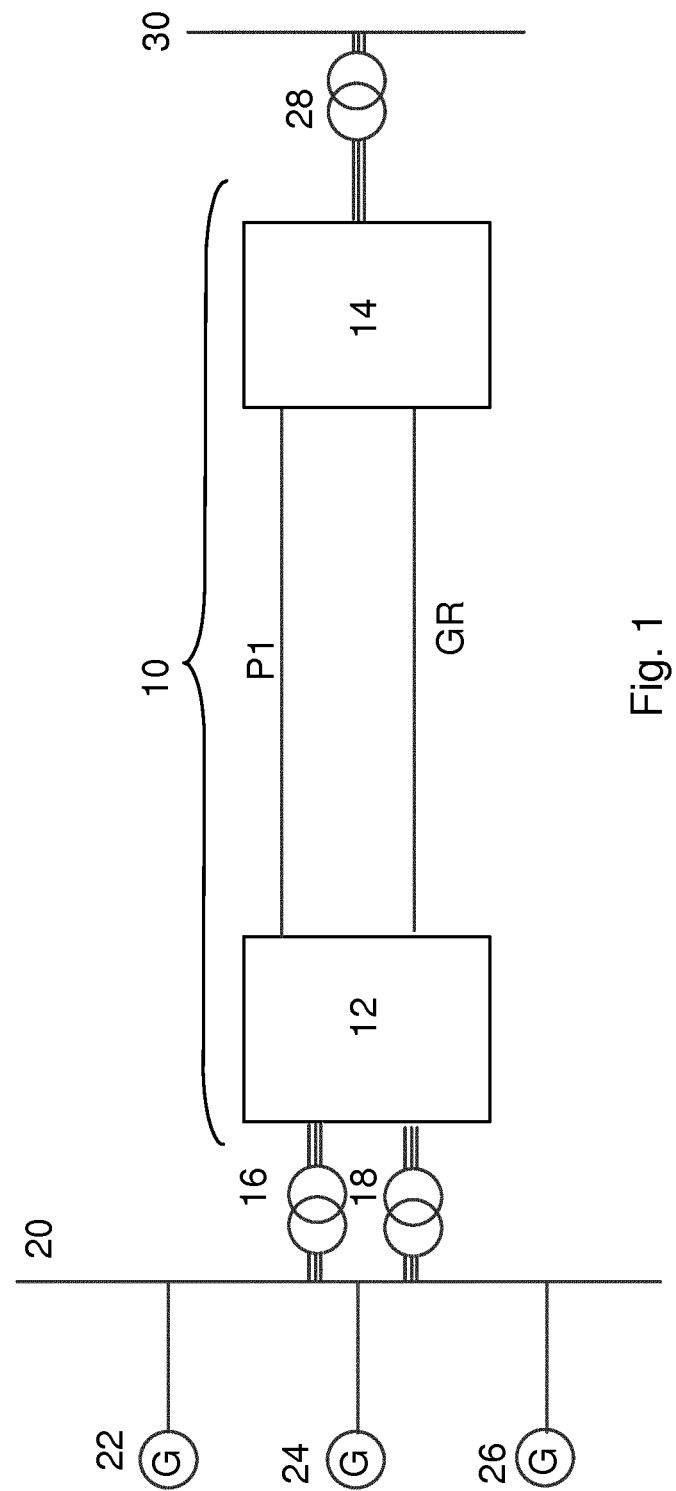

FIG. 1 shows a power generating system 20, which comprises a number of generators G 22, 24 and 26. These generators 22, 24 and 26 may be wind mills in a windfarm park. They may also be hydro power generators in a hydro power environment or solar panels in a solar panel environment. It is also possible of a mixture of generators of different types. The power generating system 20, which is an alternating current (AC) system is in turn connected to a first converter station of a direct current (DC) power transmission system 10, where the first converter station comprises a first converter 12 and a first and second transformer 16 and 18. The first converter station is also an interface of the DC power transmission system 10 to the power generation system 20. It can furthermore be seen that the power generating system 20 is connected to the first converter 12 via the first and second transformers 16 and 18. The DC power transmission system 10 may as an example be a High Voltage Direct Current (HVDC) power transmission system operating at voltages at or above 800 kV. The converter 12 is a multilevel voltage source converter and therefore comprises a number of cells configured to provide voltage contributions used for forming an AC waveform.

The DC power transmission system 10 comprises a DC link over which power is transmitted from the power generation system 20 to an AC grid 30. The DC link does in this case comprise a pole P1 and aground return GR which pole P1 and ground return G1 may be realized in the form of conductors that interconnect the first converter station comprising the first converter 12 with a second converter station comprising a second converter 14 and a third transformer 28. The second converter 14 also converts between AC and DC. One or both of the pole P1 and ground return GR may furthermore be realized through an overhead line.

The second converter 14 is in turn connected to the AC grid 30 via the third transformer 28.

The DC power transmission system 10 is schematic and may be varied in a number of ways. It should for instance be realized that it is possible that the second converter 14 is connected to the AC grid 30 via two transformers in the same was as the first converter 12 is connected to the power generating system 20. Furthermore the DC power transmission system 10 shown is a so-called asymmetric monopole system. It should be realized that it may also be symmetric monopole system, where the ground return is replaced by a second pole, or a bipole system, in which case there would be two further converters one on each side of the DC link connected in cascade with the first and second converters 12 and 14, respectively. Furthermore, in the case of a bipole system the DC link would also comprise a second pole instead of or in addition to aground return. In this case the first and the second converters would be connected between the first pole and ground and the additional converters would be connected between ground and the second pole.

It should also be realized that the DC transmission system 10 may be a multi-terminal DC transmission system comprising several converter stations and DC links, thereby forming a DC grid.

Figure 2:
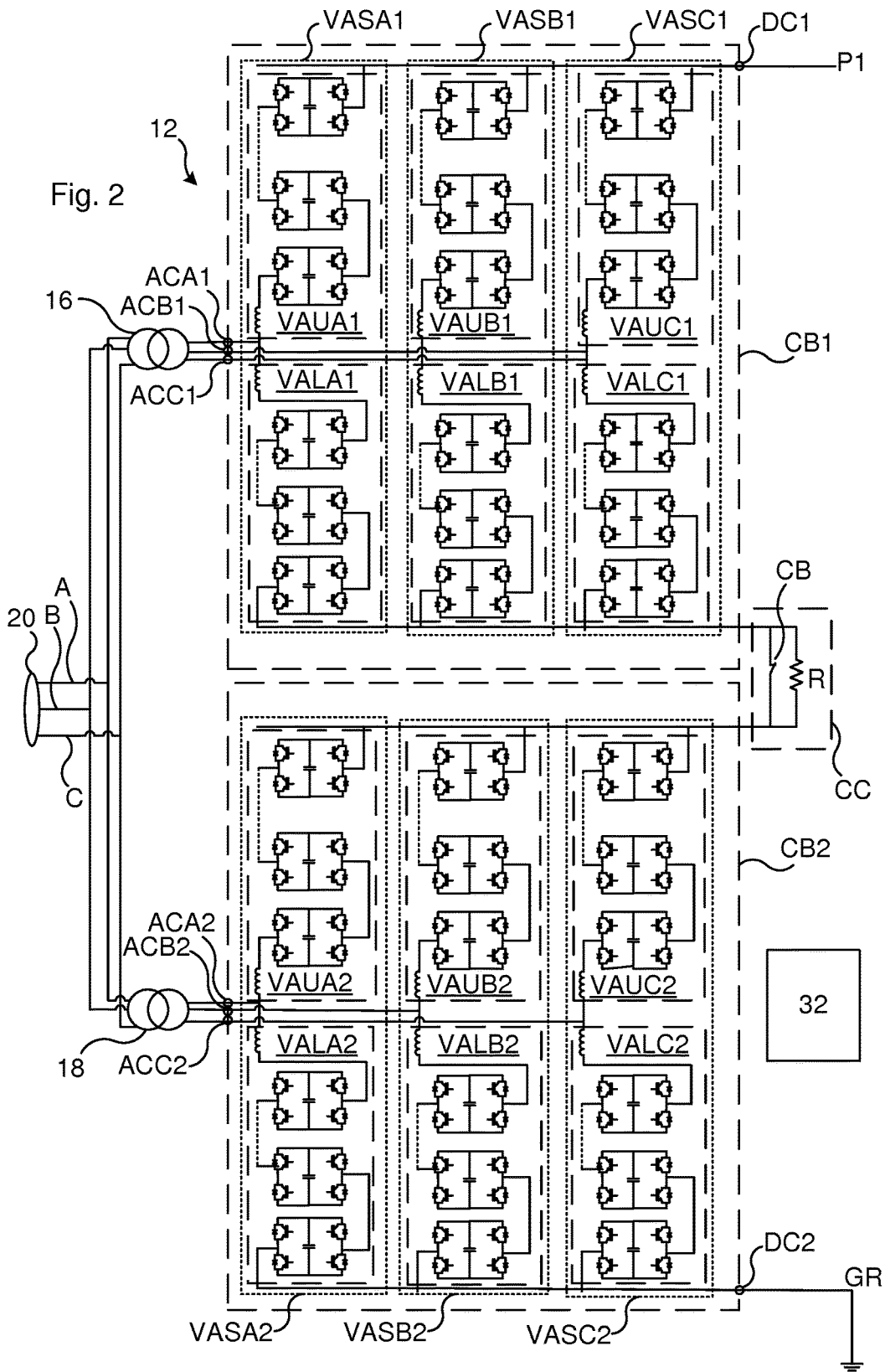

FIG. 2 schematically shows a converter station that is an interface between the power generation system 20 and the power transmission system 10. This converter station is a part of the DC power transmission system 20 and comprises the first converter 12 and the first and second transformers 16 and 18.

The first converter 12 has an AC side on which it comprises a number of AC terminals ACA1, ACB1, ACC1, ACA2, ACB2, ACC2 for connection to the first and second transformers 16 and 18. In the example of the first embodiment the power generation network 20 is a three phase AC network. For this reason the AC side comprises connection terminals for each phase. There is here a primary and a secondary first phase terminal ACA1 and ACA2 for a first AC phase, a primary and secondary second phase terminal ACB1 and ACB2 for a second AC phase B and a primary and secondary third phase terminal ACC1 and ACC2 for a third AC phase C. The first converter 12 also has a DC side, which DC side comprises a first DC terminal DC1 connected to the first DC pole P1 and a second DC terminal DC2 connected to the ground return GR.

The first converter 12 comprises at least two converter blocks, each configured to convert between AC and DC. In the present example it comprises a first and a second converter block CB1 and CB2. The converter blocks CB1 and CB2 are connected in series between the first and the second DC terminal DC1 and DC2 and between these converter blocks there is connected a chopper circuit CC. The chopper circuit CC is thus connected in a series connection path between the first and second DC terminals DC1 and DC2.

Each converter block CB1 and CB2 comprises a number of parallel valve arm strings VASA1, VASB1, VASC1, VASA2, VASB2 and VASC2, where there is one valve arm string per phase. One end of the all the valve arm strings VASA1, VASB1, VASC1 of the first converter block CB1 is thus connected to the first DC terminal DC1, with the other end of these strings connected to a first end of the chopper circuit CC. One end of all the valve arm strings VASA2, VASB2, VASC2 of the second converter block CB2 is in a similar way connected to a second end of the chopper circuit CC, with the other end of these strings connected to the second DC terminal DC2. Each valve arm string furthermore comprises an upper valve arm and a lower valve arm.

The first converter block CB1 thus comprises a first valve arm string VASA1 for the first phase A, a second valve arm string VASB1 for the second phase B and a third valve arm string VASC1 for the third phase C. The first valve arm string VASA1 comprises an upper valve arm VAUA1 and a lower valve arm VALA1. The second valve arm string VASB1 comprises an upper valve arm VAUB1 and a lower valve arm VALB1 and the third valve arm string VASC1 comprises an upper valve arm VAUC1 and a lower valve arm VALC1.

In a similar manner, the second converter block CB2 comprises a first valve arm string VASA2 for the first phase A, a second valve arm string VASB2 for the second phase B and a third valve arm string VASC2 for the third phase C, where the first valve arm string VASA2 comprises an upper valve arm VAUA2 and a lower valve arm VALA2, the second valve arm string VASB2 comprises an upper valve arm VAUB2 and a lower valve arm VALB2 and the third valve arm string VASC2 comprises an upper valve arm VAUC2 and a lower valve arm VALC2.

All the valve arms further more comprise a number of cells connected in cascade. As can be seen in FIG. 2 the cells in this figure are full-bridge cells.

Each such cell comprises an energy storage element, here exemplified by a capacitor C, which is connected in parallel with a first group of switches. The first group more particularly comprises series-connected switches. There is also a second group of switches connected in parallel with the switches of the first group as well as with the energy storage element. Both groups are here made up of two switches. Also the switches of the second group are connected in series with each other. Each switch may be formed through a transistor, like an Insulated Gate Bipolar Transistor (IGBT), with anti-parallel diode. It should be realized that it is possible to use other types of semiconductor devices of the turn-off type as switches, such as Integrated Gate-Commutated Thyristors (IGCTs). The junction between the two switches of the first group forms a first cell connection terminal, while the junction between the switches of the second group forms a second cell connection terminal. Furthermore, as can be seen in FIG. 2, the cells are connected in a valve arm with the first cell connection terminal connected to the second cell connection terminal of a previous cell.

It should here be realized that as a variation of the above-described converter configuration, the cells in the lower valve arms VALA1, VALB1 and VALC1 of the first converter block CB1 and the cells of the upper valve arms VAUA2, VAUB2 and VAUC2 of the second converter block CB2 may be half-bridge cells. As is well-known one of the above-mentioned groups of switches is in this case removed and the cell connection terminal that was present in this group is instead moved to a junction between the remaining group of switches and the energy storage element.

It can be seen in FIG. 2 that a midpoint between the upper and lower valve arm of a valve arm string in the first converter block CB1 is connected to a corresponding primary AC terminal provided for a certain phase and a midpoint between the upper and lower valve arm in a corresponding valve arm string of the second converter block CB2 is connected to a corresponding secondary AC terminal for the same or another phase. It can also be seen that such a midpoint is connected to the upper valve arm via an upper phase inductor and to the lower arm via a lower arm inductor.

It can thus be seen that the midpoint of the first valve arm string VASA1 of the first converter block CB1 is connected to the primary AC terminal ACA1 for the first phase A, while the midpoint of the first valve arm string VASA2 of the second converter block CB2 is connected to the secondary AC terminal ACA2 for the first phase A. Here the primary terminal ACA1 is connected to a cell of the upper valve arm VAUA1 via a phase inductor and to a cell of the lower valve arm VALA1 via another phase inductor, while the secondary terminal ACA2 is connected to a cell of the upper valve arm VAUA2 via a further phase inductor and to a cell of the lower valve arm VALA2 via yet another phase inductor. It should be realized that the order in which cells and inductors are connected in a phase arm may be varied. A phase inductor may thus be connected between the first or the second DC terminals and the cells or between the chopper circuit and the cells.

Also the midpoint of the second valve arm string VASB1 of the first converter block CB1 is connected to the primary AC terminal ACB1 for the second phase B, while the midpoint of the second valve arm string VASB2 of the second converter block CB2 is connected to the secondary AC terminal ACB2 for the second phase B. Here the primary terminal ACB1 is connected to a cell of the upper valve arm VAUB1 via a phase inductor and to a cell of the lower valve arm VALB1 via another phase inductor, while the secondary terminal ACB2 is connected to a cell of the upper valve arm VAUB2 via a further phase inductor and to a cell of the lower valve arm VALB2 via yet another phase inductor.

The midpoint of the third valve arm string VASC1 of the first converter block CB1 is connected to the primary AC terminal ACC1 for the third phase C, while the midpoint of the third valve arm string VASC2 of the second converter block CB2 is connected to the secondary AC terminal ACC2 for the third phase C. Here the primary terminal ACC1 is connected to a cell of the upper valve arm VAUC1 via a phase inductor and to a cell of the lower valve arm VALC1 via another phase inductor, while the secondary terminal ACC2 is connected to a cell of the upper valve arm VAUC2 via a further phase inductor and to a cell of the lower valve arm VALC2 via yet another phase inductor.

It can be seen that the first phase A of the power generation system 20 is connected to the primary AC terminal ACA1 via the first transformer 16 and to the secondary AC terminal ACA2 via the second transformer 18, that the second phase B of the power generation system 20 is connected to the primary AC terminal ACB1 via the first transformer 16 and to the secondary AC terminal ACB2 via the second transformer 18 and that that the third phase C of the power generation system 20 is connected to the primary AC terminal ACC1 via the first transformer 16 and to the secondary AC terminal ACC2 via the second transformer 18.

It can furthermore be seen that the chopper circuit CC comprises a resistor R in parallel with a circuit breaker CB, which circuit breaker may be an AC circuit breaker or a DC circuit breaker. What is important is that the opening of the circuit breaker is performed at or close to zero current levels through the chopper circuit CC. The resistance value of the resistor may be chosen in relation to the required power dissipation and the current capability of the valve arms. The resistor R is one example of a resistive power dissipating element or power dissipating circuit that may be used for dissipating power generated in the power generating system 20. A power dissipating element may as an example be another type of resistive element. It may for instance be a varistor or an arrester, i.e. a voltage dependent resistive element.

In order to operate the converter blocks CB1 and CB2 and chopper circuit CC there is also a control unit 32, which control unit 32 controls the operation of the cells, through turning on and off the cell switches, as well as controls the operation of the circuit breaker CB.

Figure 3:
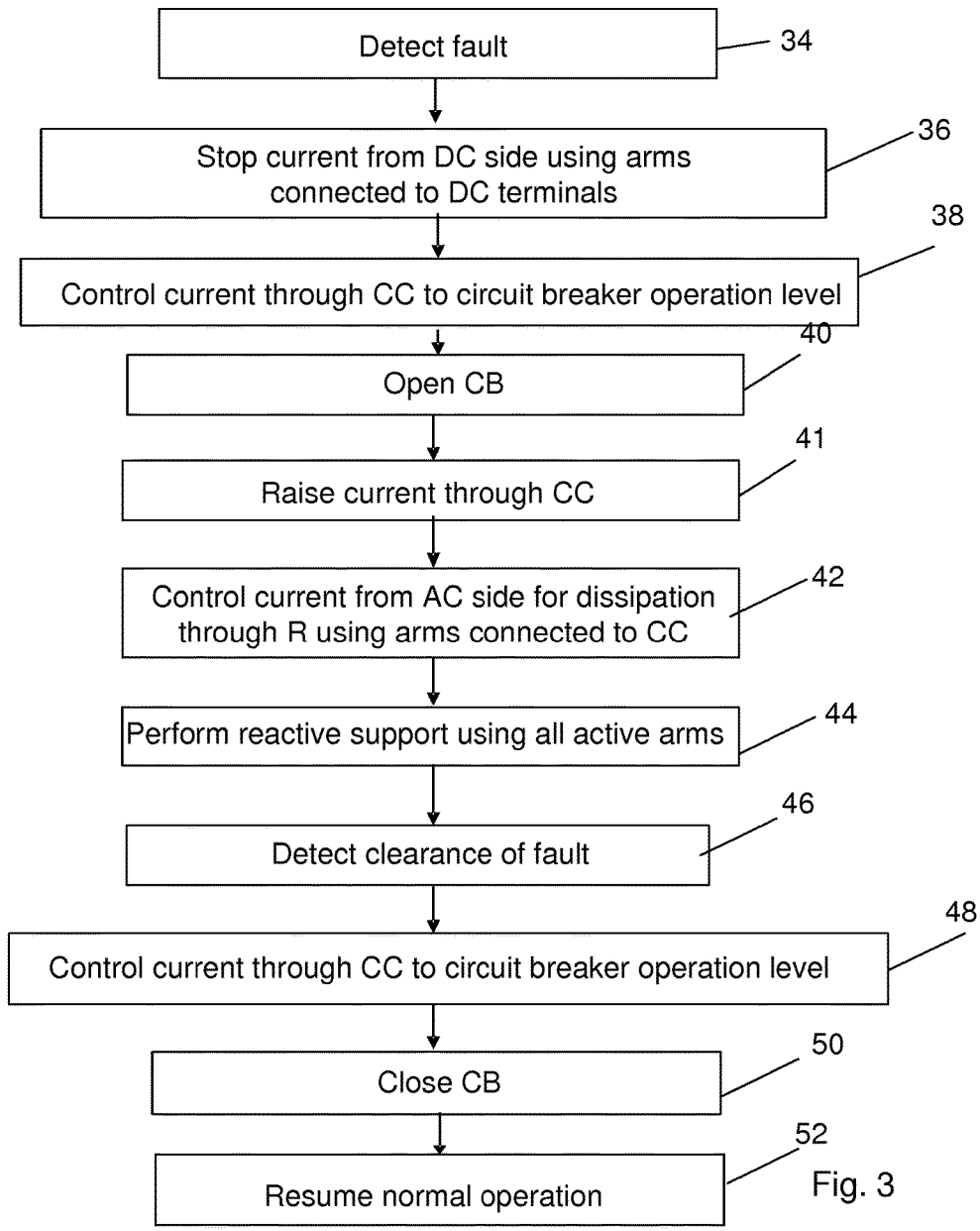

Now a first embodiment of the invention will be described also with reference being made to FIG. 3, which shows a flow chart of a number of method steps in a method for handling power dissipation during faults on the AC side or the DC side of the multilevel converter.

The exemplifying power generation system 20 may bean isolated system, meaning that it may only be connected to the AC grid 30 via the DC power transmission system 10.

It may furthermore be a windfarm or a hydro power generating system and for this reason it may also be a weak system.

The DC power transmission system 10 may furthermore have its DC link at least partly provided through overhead lines.

There may occur a fault in either the power generation system 20 or in the DC power transmission system 10, i.e. either at the DC side or the AC side of the converter 12. One example of such a fault is a pole fault at the pole P1. When a fault occurs it may be necessary to isolate the power transmission system 10 from the power generating system 20 for protective purposes.

However, the DC power transmission system 10 will in this case still generate power and it may be necessary to dissipate this power through a power dissipating element in order to stabilize the frequency of the power generation system.

The chopper circuit CC of the converter 12 provides a resistor R that can be used for this purpose.

In steady-state operation of the DC transmission system 10 the cells of the converter 12 are used for forming an AC voltage on the different AC phase terminals. The cells of a valve arm string are then controlled to form a waveform resembling a sine wave, where the cell switches are switched such that the voltage contributions of the cell capacitors are made to form the waveform. The first valve arm strings VASA1 and VASA2 of both the first and second converter block CB1 and CB2 may be made to form the waveform of the first phase, the second valve arm strings VASB1 and VASB2 of both the first and second converter blocks CB1 and CB2 may be made to form the waveform of the second phase and the third valve arm strings VASC1 and VASC2 of both the first and second converter block CB1 and CB2 may be made to form the waveform of the third phase. The waveforms of the two blocks CB1 and CB2 may be in-phase or phase-shifted in relation to each other depending on in which way the two transformers are connected. Furthermore in order to transmit power generated by the power generating system 20, the voltage between the first and second DC terminals DC1 and DC2 of the first converter 12 is somewhat higher than the voltage between the corresponding terminals of the second converter 14, thereby achieving a transfer of power via the DC link.

Here it maybe mentioned that the provision of two converter blocks in this way allows the provision of very high DC voltages without having to use large and bulky transformers.

Now, as was mentioned above, there may occur a fault on either side of the converter 12, for instance a DC fault through the pole P1 being short-circuited. Thereby the pole P1 will experience a zero voltage at the location of the fault, which will cause a fault current to enter the converter 12.

This may mean that a fault current may run from the DC system 10 and into the converter 12. This current may furthermore be harmful to the converter 12, which may therefore need to be isolated from the system 10. However, this will also lead to the power generation system 20 being isolated from the DC transmission system 10. This may in turn lead to a need for dissipating power generated by the power generating system 20, especially if the frequency of the power generating system 20 is to be kept stable.

The method therefore starts with a fault being detected, step 34, for instance a DC fault. This detection may be made by the control unit 32 itself. As an alternative it is possible that the control unit 32 is informed about the fault by a dedicated fault handling circuit, which fault handling circuit in the case of a DC fault would be provided in the DC power transmission system 10.

After the fault has been detected it is thereafter necessary to isolate the first converter 12 from the DC system 10. This is done through controlling at least one set of valve arms connected to the DC terminals DC1 and DC2 to reduce a current originating from the DC side to zero, step 36. The control is thus a control to stop the current from the DC side using valve arms connected to a DC terminal. The set may comprise all the upper valve arms VAUA1, VAUB1, VAUC1 of the first converter block CB1 or all the lower valve arms VALA2, VALB2, VALC2 of the second converter block (CB2). The arms that can be used for this isolation are thus the upper arms VAUA1, VAUB1, VAUC1 of the first converter block CB1 and the lower arms VALA2, VALB2 and VALC2 of the second converter block CB2. It is here possible that only one of the converter blocks is used for this. It is thus possible to only use the upper arms VAUA1, VAUB1, VAUC1 of the first converter block CB1 or the lower arms VALA2, VALB2 and VALC2 of the second converter block CB2. Alternatively it is possible to use both converter blocks, i.e. to use two such sets connected to the Dc terminals DC1 and DC2.

In one variation of the invention, the cells of one of these sets of connected valve arms are blocked. In this case either the cells of the upper arms VAUA1, VAUB1, VAUC1 of the first converter block CB1 or the cells of the lower arms VALA2, VALB2 and VALC2 of the second converter block CB2 are blocked. A blocking involves the switches being turned off or the valves being opened. The control signals for operating the cells may also be disabled. Thereby the fault current being fed through the arms is blocked by the cell capacitors. The arms that have their cells blocked are then termed inactive, while cells that have their cells operable are active.

As an alternative it is possible that all cells are kept active. In this case either of the sets of arms or both may be controlled so that they lower the DC current down to zero. This type of control may be somewhat harder to realize since the steady-state current control has a resolution adapted to the state-state current levels, which are typically very high.

Thereafter the control unit 32 controls the converter 12 to dissipate energy received via the AC terminals. This may involve controlling the lower valve arms VALA1, VALB1, VALC1 of the first converter block CB1 and upper valve arms VAUA2, VAUB2, VAUC2 of the second converter block CB2 to reduce the current through the chopper circuit CC. As the DC current is already zero this means that the current contribution from the power generating system 20 is now reduced.

The control may more particularly comprise controlling the lower valve arms VALA1, VALB1, VALC1 of the first converter block CB1 and the upper valve arms VAUA2, VAUB2, VAUC2 of the second converter block CB2 to reduce the current through the chopper circuit CC to a level at which circuit breaker operation may be performed, step 38, i.e. to a circuit breaker operation level. If the circuit breaker CB is an AC circuit breaker, the control unit 32 the circuit breaker operation level may be the level where the current is to be disrupted, i.e. a current disrupting current level, such as zero. The level may in this case be a zero current level. In this case circuit breaker operation thus starts at a zero current level, which is a current disrupting level.

However, if the circuit breaker CB is a DC circuit breaker, this control may involve the lower valve arms VALA1, VALB1, VALC1 of the first converter block CB1 and the upper valve arms VAUA2, VAUB2, VAUC2 of the second converter block CB2 being controlled to limit the current through the chopper circuit CC to a level at which the DC circuit breaker can operate, i.e. to the circuit breaker operation level. In this case the DC circuit breaker may, during the circuit breaker operation, then take care of the final current reduction needed for obtaining the current disrupting level, such as zero.

When in the circuit breaker operation a current disrupting level has been obtained, the control unit 32 then opens the circuit breaker CB, step 40. The control unit 32 thus controls the circuit breaker to open at a current disrupting level that has been obtained during the circuit breaker operation. Thereby it is now possible for current to run through the resistor R and the power of the power generation system 20 thereby getting dissipated.

In order to achieve this power dissipation, the control unit 32 controls the valve arms that are connected to the chopper circuit CC, i.e. the lower valve arms VALA1, VALB1, VALC1 of the first convert block CB1 and the upper valve arms VAUA2, VAUB2, VAUC2 of the second converter block CB2, to raise the current through the chopper circuit CC, step 41. It is then raised to a level that achieves the desired dissipation of generated power. Thereafter the control unit 32 controls the same valve arms VALA1, VALB1, VALC1, VAUA2, VAUB2 and VAUC2 so that the current from the AC side is dissipated through the resistor R, step 42. The valve arms are thus controlled to let a current originating on the AC side of the converter to be dissipated through the resistor R.

At the same time as this power dissipation takes place it is possible to perform reactive support of the power generating system 20. In this reactive support it is then possible to use all active valve arms. The reactive power compensation may thereby be performed through the control unit 32 controlling the active arms to perform reactive support of the power generating system, step 44. This means that at least three out of four valve arms may be used for reactive support. In all cases the lower valve arms VALA1, VALB1, VALC1 of the first converter block CB1 and the upper valve arms VAUA2, VAUB2, VAUC2 of the second converter block CB2 may be used. In addition to this one or both of the sets made up of the upper valve arms VAUA1, VAUB1 and VAUC1 of the first converter block CB1 and the lower valve arms VALA2, VALB2 and VALC2 of the second converter block CB2 may be used in dependence of if the cells of a set of valve arms are blocked for stopping the DC current and if this is the case in which set the cells are blocked. A converter arm with the cells being blocked can thus not contribute to reactive power compensation. If for instance the cells of the upper valve arms VAUA1, VAUB1 and VAUC1 of the first converter block CB1 are used, then only the lower valve arms VALA2, VALB2 and VALC2 of the second converter block CB2 are used together with the valve arms VALA1, VALB1, VALC1, VAUA2, VAUB2 and VAUC2 for reactive power compensation.

Thereafter the control unit 32 waits for a detection of the fault being cleared. The detection may yet again be performed by the control unit 32 or dedicated fault handling circuits, for instance dedicated fault handling circuits in the DC power transmission system 10.

When a clearing has been detected, step 46, the control unit 32 controls the converter (12) to stop dissipating energy received via the AC side.

This control may comprise the control unit 32 again controlling the lower valve arms VALA1, VALB1, VALC1 of the first converter block CB1 and the upper valve arms VAUA2, VAUB2, VAUC2 of the second converter block CB2 to reduce the current through the chopper circuit CC to a level at which circuit breaker operation may be performed, step 48, i.e. to a circuit breaker operation level, which may be a zero level.

A suitable current disrupting level may then be obtained in the same way as was described earlier. When a suitable current disrupting level is then obtained, the control unit 32 controls the circuit breaker CB to close during said circuit breaker operation. It thus closes the circuit breaker CB, step 50. This means that now current will bypass the resistor R and thereby power dissipation ceases. The current disrupting level does not have to be zero. The control objectives at this stage could instead be to minimize any bump or over-current through the valve arms that could arise at the sudden short circuit of the chopper resistor by closing the circuit breaker.

Thereafter normal operation is resumed, step 52, which may involve the control unit 32 to controlling valve arms connected to the DC terminals to allow DC current to again flow through the converter 12, which may involve a de-blocking of blocked valve arms. The resuming of normal operation may also comprise changing current control mode for delivery of power.

The invention has a number of advantages. It minimizes the non-transferred energy and thereby also stabilizes the frequency of the power generation system. It is also able to provide reactive support of this power generation system. The circuit breaker can be made simple, because it does not have to any current breaking capability due to the ability of the converter to control the current through the chopper circuit—close to zero. Cost of the chopper is significantly reduced as well as the chopper operation being available both for DC and AC side fault ride through.

In the example above there were two converter blocks between the two DC terminals. It should however be realized that there may be more converter blocks between the terminals, for instance three or four. In this case there may be a chopper circuit between each converter block. Furthermore the two transformers may be Y/Y-connected or Y/Δ-connected.

Figure 4:
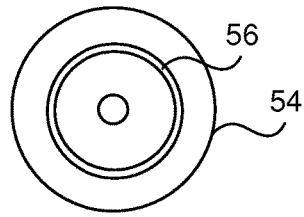

The control unit 32 may be realized in the form of discrete components, such as an application-specific integrated circuit (ASIC) or a Field-Programmable Gate Array (FPGA) circuit. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into the control unit. One such data carrier in the form of a CD Rom disk 54 carrying computer program code 56 is shown in FIG. 4.

From the foregoing discussion it is evident that the present invention can be varied in a multitude of ways. It shall consequently be realized that the present invention is only to be limited by the following claims.

The invention claimed is:

1. A multilevel converter having an alternating current (AC) side and a Direct Current (DC) side and being configured to convert between AC and DC and comprising:
at least two converter blocks connected in series between a first and a second DC terminal; and
a chopper circuit connected between the converter blocks, wherein each converter block comprises a number of parallel valve arm strings, where each valve arm string comprises an upper valve arm connected in series with a lower valve arm having a number of converter cells connected in cascade,
wherein a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal,
wherein the chopper circuit comprises a power dissipating element in parallel with a circuit breaker, and
wherein the multilevel converter is controllable to dissipate energy received via the AC terminals upon the detection of a fault at one of the sides,
where, in order to obtain said energy dissipation and upon the detection of said fault, at least one set of valve arms connected to the DC terminals, is controllable to reduce the fault current from the DC side to zero and the converter when being controllable to dissipate energy received via the AC terminals comprises the lower valve arms of the first converter block and the upper valve arms of the second converter block being controllable to reduce the current through the chopper circuit to a level at which circuit breaker operation may be performed, the circuit breaker of the chopper circuit being controllable to open during said circuit breaker operation, and the lower valve arms of the first converter block and the upper valve arms of the second converter block being controllable to let a current originating on the AC side of the converter to be dissipated through the power dissipating element of the chopper circuit.

2. The multilevel converter according to claim 1, wherein the cells of said set are controllable to reduce the current through the converter originating from the DC side to zero through being blockable.

3. The multilevel converter according to claim 2, the multilevel converter being further controllable to stop dissipating energy received via the AC side upon the detection of a clearing of the fault.

4. The multilevel converter according to claim 2, wherein the lower valve arms of the first converter block and the upper valve arms of the second converter block are controllable to perform reactive power compensation in relation to the AC side of the converter.

5. The multilevel converter according to claim 1, the multilevel converter being further controllable to stop dissipating energy received via the AC side upon the detection of a clearing of the fault.

6. The multilevel converter according to claim 5, wherein the converter when being controllable to stop dissipating energy comprises the circuit breaker of the chopper circuit being controllable to close and said at least one set of valve arms being controllable to allow DC current to again flow through the converter.

7. The multilevel converter according to claim 6, wherein the lower valve arms of the first converter block and the upper valve arms of the second converter block are controllable to perform reactive power compensation in relation to the AC side of the converter.

8. The multilevel converter according to claim 5, wherein the lower valve arms of the first converter block and the upper valve arms of the second converter block are controllable to perform reactive power compensation in relation to the AC side of the converter.

9. The multilevel converter according to claim 1, wherein the lower valve arms of the first converter block and the upper valve arms of the second converter block are controllable to perform reactive power compensation in relation to the AC side of the converter.

10. The multilevel converter according to claim 1, wherein the circuit breaker is an AC circuit breaker.

11. The multilevel converter according to claim 1, wherein the circuit breaker is a DC circuit breaker.

12. The multilevel converter according to claim 1, further comprising a control unit configured to control the converter blocks and the chopper circuit.

13. The multilevel converter according to claim 1, wherein at least the cells of the upper valve arms of the first converter block and the cells of the lower valve arms of the second converter block are full-bridge cells.

14. The multilevel converter according to claim 1, wherein all the cells in the converter are full-bridge cells.

15. A method for handling power dissipation during faults at an alternating current (AC) side or a Direct Current (DC) side of a multilevel converter configured to convert between AC and DC, the method being performed in the multilevel converter and comprising:
at least two converter blocks connected in series between a first and a second DC terminal; and a chopper circuit connected between the converter blocks,
wherein each converter block comprises a number of parallel valve arm strings, where each valve arm string comprises an upper valve arm connected in series with a lower valve arm having a number of converter cells connected in cascade,
wherein a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal, and
wherein the chopper circuit comprises a power dissipating element in parallel with a circuit breaker,
the method comprising the steps of:
controlling the multilevel converter to dissipate energy received via the AC terminals upon the detection of a fault at one of the sides of the multilevel converter; and
controlling, in order to obtain said energy dissipation and upon the detection of said fault, at least one set of valve arms connected to the DC terminals to reduce a current originating from the DC side to zero, where the controlling of the converter to dissipate energy received via the AC terminals comprises controlling the lower valve arms of the first converter block and the upper valve arms of the second converter block to reduce the current through the chopper circuit to a level at which circuit breaker operation may be performed, controlling the circuit breaker of the chopper circuit to open during said circuit breaker operation and controlling the lower valve arms of the first converter block and the upper valve arms of the second converter block to let a current originating on the AC side of the converter to be dissipated through the power dissipating element of the chopper circuit.

16. The method according to claim 15, wherein the cells of said set are controlled to reduce the current through the converter originating from the DC side to zero through being blocked.

17. The method according to claim 15, further comprising controlling the lower valve arms of the first converter block and the upper valve arms of the second converter block to perform reactive power compensation in relation to the AC side of the converter.

18. The method according to claim 15, further comprising controlling the multilevel converter to stop dissipating energy received via the AC side upon the detection of a clearing of the fault.

19. The method according to claim 18, wherein the controlling of the chopper circuit to stop dissipating comprises controlling the circuit breaker of the chopper circuit to close, the method further comprising controlling said at least one set of valve arms to allow DC current to again flow through the converter.

20. A computer program product for handling power dissipation during faults at an alternating current (AC) side or a Direct Current (DC) side of a multilevel converter configured to convert between AC and DC, the multilevel converter comprising:
at least two converter blocks connected in series between a first and a second DC terminal; and
a chopper circuit connected between the converter blocks,
wherein each converter block comprises a number of parallel valve arm strings, where each valve arm string comprises an upper valve arm connected in series with a lower valve arm having a number of converter cells connected in cascade,
wherein a midpoint between the upper and lower valve arm of a valve arm string in the first converter block is connected to a corresponding primary AC terminal and a midpoint between the upper and lower valve arm in a corresponding valve arm string of the second converter block is connected to a corresponding secondary AC terminal, and
wherein the chopper circuit comprises a power dissipating element in parallel with a circuit breaker,
the computer program product comprising a data carrier with computer program code, which computer program code when being loaded in a control unit for the multilevel converter is configured to cause the control unit to control the multilevel converter to dissipate energy received via the AC terminals upon the detection of a fault at one of the sides of the multilevel converter,
where, in order to obtain said energy dissipation and upon the detection of said fault, at least one set of valve arms connected to the DC terminals, is controlled to reduce the fault current from the DC side to zero and the converter when being controlled to dissipate energy received via the AC terminals comprises the lower valve arms of the first converter block and the upper valve arms of the second converter block being controlled to reduce the current through the chopper circuit to a level at which circuit breaker operation may be performed, the circuit breaker of the chopper circuit being controlled to open during said circuit breaker operation, and the lower valve arms of the first converter block and the upper valve arms of the second converter block being controlled to let a current originating on the AC side of the converter to be dissipated through the power dissipating element of the chopper circuit.

* * * * *